(12) United States Patent
Arumugam

(10) Patent No.: US 7,873,540 B2
(45) Date of Patent: Jan. 18, 2011

(54) VIRTUAL TERMINAL PAYER AUTHORIZATION SYSTEMS AND METHODS

(75) Inventor: Avin Arumugam, Denver, CO (US)

(73) Assignee: First Data Corporation, Greenwood Village, CO (US)

( * ) Notice: Subject to any disclaimer, the term of this patent is extended or adjusted under 35 U.S.C. 154(b) by 572 days.

(21) Appl. No.: 11/533,596

(22) Filed: Sep. 20, 2006

(65) Prior Publication Data

US 2008/0071625 A1 Mar. 20, 2008

(51) Int. Cl.
*G06Q 20/00* (2006.01)
(52) U.S. Cl. ........................................ 705/17
(58) Field of Classification Search ............... 705/14
See application file for complete search history.

(56) References Cited

U.S. PATENT DOCUMENTS

| | | | | |
|---|---|---|---|---|
| 7,379,920 | B2* | 5/2008 | Leung et al. | 705/67 |
| 7,536,352 | B2* | 5/2009 | Lapsley et al. | 705/44 |
| 7,558,407 | B2* | 7/2009 | Hoffman et al. | 382/115 |
| 2005/0109838 | A1* | 5/2005 | Linlor | 235/380 |
| 2006/0016880 | A1* | 1/2006 | Singer et al. | 235/380 |
| 2006/0020542 | A1* | 1/2006 | Litle et al. | 705/40 |
| 2006/0053056 | A1* | 3/2006 | Alspach-Goss et al. | 705/14 |
| 2007/0011044 | A1* | 1/2007 | Hansen | 705/14 |
| 2007/0011099 | A1* | 1/2007 | Sheehan | 705/65 |
| 2007/0156436 | A1* | 7/2007 | Fisher et al. | 705/1 |
| 2008/0313064 | A1* | 12/2008 | Nelson | 705/30 |

OTHER PUBLICATIONS

Issuers Use Credit Cards to Add to Their Online Debit Card Rolls, Debit Card News , v 4 , n 6 , p. 5 Sep. 15, 1998.*

* cited by examiner

*Primary Examiner*—Vanel Frenel
*Assistant Examiner*—R. Shay Glass
(74) *Attorney, Agent, or Firm*—Townsend and Townsend and Crew LLP

(57) ABSTRACT

A method of obtaining payer authorization for a purchase instrument transaction with a customer includes using a wireless device of a merchant to contact a virtual terminal service to process the transaction, entering transaction information into the wireless device, which transaction information includes an account identifier relating to the purchase instrument of the customer, forwarding the transaction information from the wireless device to the virtual terminal service, receiving at the wireless device a request from the virtual terminal service to receive payer authorization information from the customer, receiving the payer authorization directly from the customer into the wireless device of the merchant, forwarding the payer authorization from the wireless device to the virtual terminal service, and receiving an approval message from the virtual terminal service at the wireless device of the merchant.

14 Claims, 4 Drawing Sheets

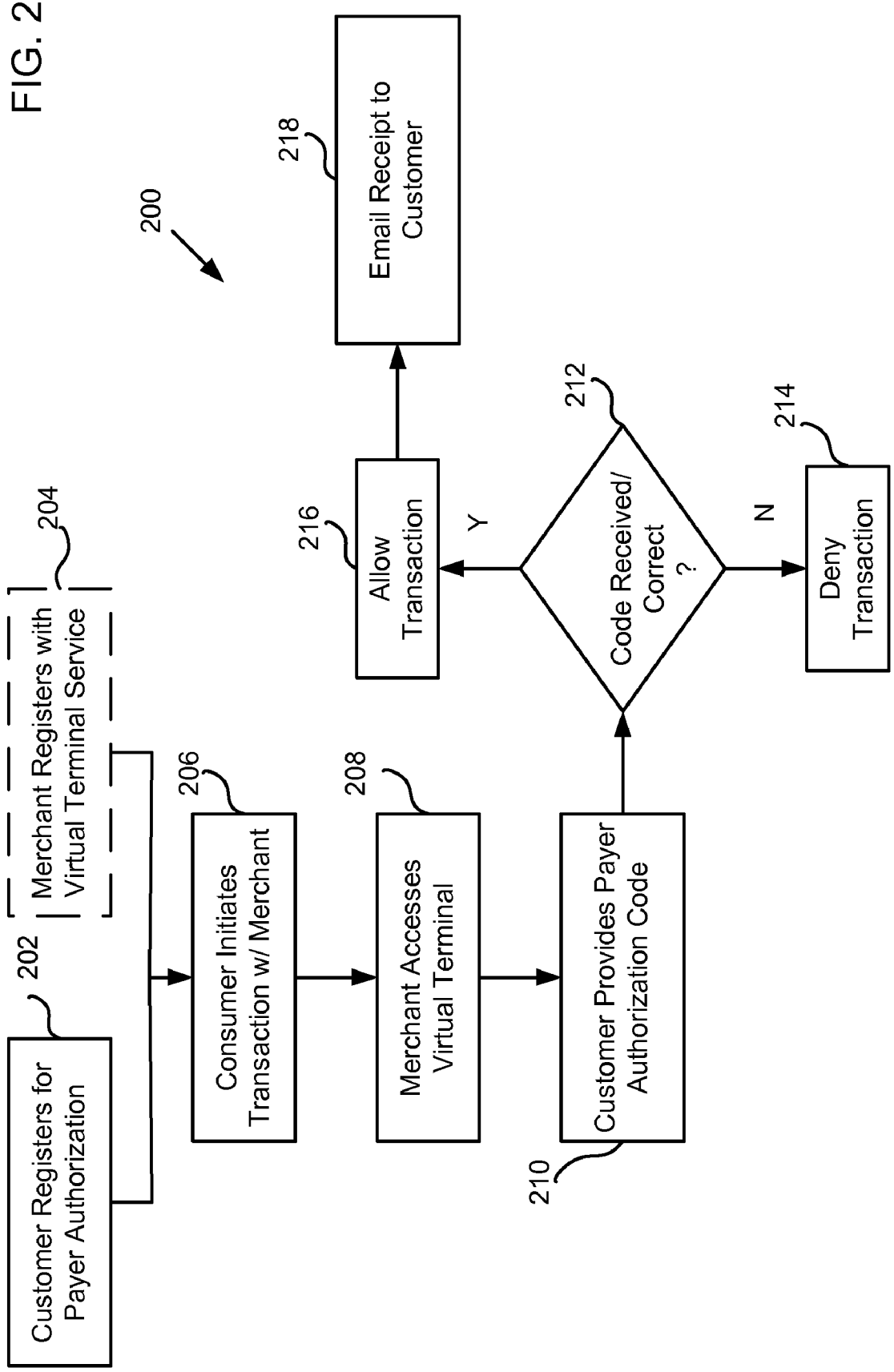

VIRTUAL TERMINAL PAYER AUTHORIZATION SYSTEMS AND METHODS

Embodiments of the present invention relate generally to a payer authorization system for purchase transactions. More specifically, embodiments of the present invention relate to systems and methods for obtaining payer authorization for a purchase transaction using a mobile device to remotely connect to a virtual terminal.

BACKGROUND OF THE INVENTION

A number of situations exist in today's marketplace wherein a merchant and a consumer are able to participate in a face-to-face transaction outside of a traditional merchant storefront. Examples include: farmer's markets; "flea" markets; swap meets; merchandise shows; conventions; and the like. In such transition situations, merchants often accept purchase instruments (e.g., credit cards, debit cards, stored value cards, etc.) as payment in these transactions. Unfortunately, however, it is not always convenient to have an appropriate point-of-sale device installed and/or enabled to process purchase instrument transactions in these situations. Consequently, merchants may be charged a higher interchange rate, give up chargeback protection, and/or the like. Hence, improved systems and methods are needed to address the shortcomings of such transactions.

BRIEF SUMMARY OF THE INVENTION

Embodiments of the present invention thus provide a method of obtaining payer authorization for a purchase instrument transaction with a customer. The method includes using a wireless device of a merchant to contact a virtual terminal service to process the transaction, entering transaction information into the wireless device, which transaction information includes an account identifier relating to the purchase instrument of the customer, forwarding the transaction information from the wireless device to the virtual terminal service, receiving at the wireless device a request from the virtual terminal service to receive payer authorization information from the customer, receiving the payer authorization directly from the customer into the wireless device of the merchant, forwarding the payer authorization from the wireless device to the virtual terminal service, and receiving an approval message from the virtual terminal service at the wireless device of the merchant.

In some embodiments, the method includes the merchant registering with the virtual terminal service prior to the transaction. The method may include the customer registering with the virtual terminal service prior to the transaction. Receiving the payer authorization information directly from the customer into the wireless device of the merchant may include the merchant handing the wireless device to the customer and the customer entering the payer authorization information into the wireless device of the merchant. Receiving the payer authorization information directly from the customer into the wireless device of the merchant may include receiving a signal into the wireless device of the merchant from a wireless device of the customer. The signal may be a Radio Frequency Identification signal. The signal may be a Near Field Communication Technology signal. The method may include receiving an electronic receipt at a wireless device of the customer. The method may include thereafter charging the merchant a reduced interchange rate relating to the transaction. The method may include providing the merchant chargeback protection for the transaction. The wireless device of the merchant may be an Internet-enabled mobile device. The wireless device of the customer may be an Internet-enabled mobile device.

In other embodiments, a method of obtaining payer authorization for a purchase instrument transaction with a customer in the absence of a point-of-sale processing terminal includes a merchant using an Internet-enabled wireless mobile communication device to contact a virtual terminal service, the merchant entering transaction information into the device, the device transferring the transaction information to the virtual terminal service, the virtual terminal service accessing a record relating to the customer, thereby identifying the customer as having registered for payer authorization, the virtual terminal service sending a payer authorization request to the device of the merchant, the customer entering payer authorization information into the device of the merchant, the device of the merchant sending the payer authorization information to the virtual terminal service, the virtual terminal service comparing the payer authorization information to stored information relating to the customer, and the virtual terminal service sending an authorization message to the device of the merchant based on the comparison.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 illustrates a method of obtaining payer authorization for a virtual terminal transaction according to embodiments of the invention, which method may be implemented in the system of FIG. 1.

DETAILED DESCRIPTION OF THE INVENTION

Figure 1:
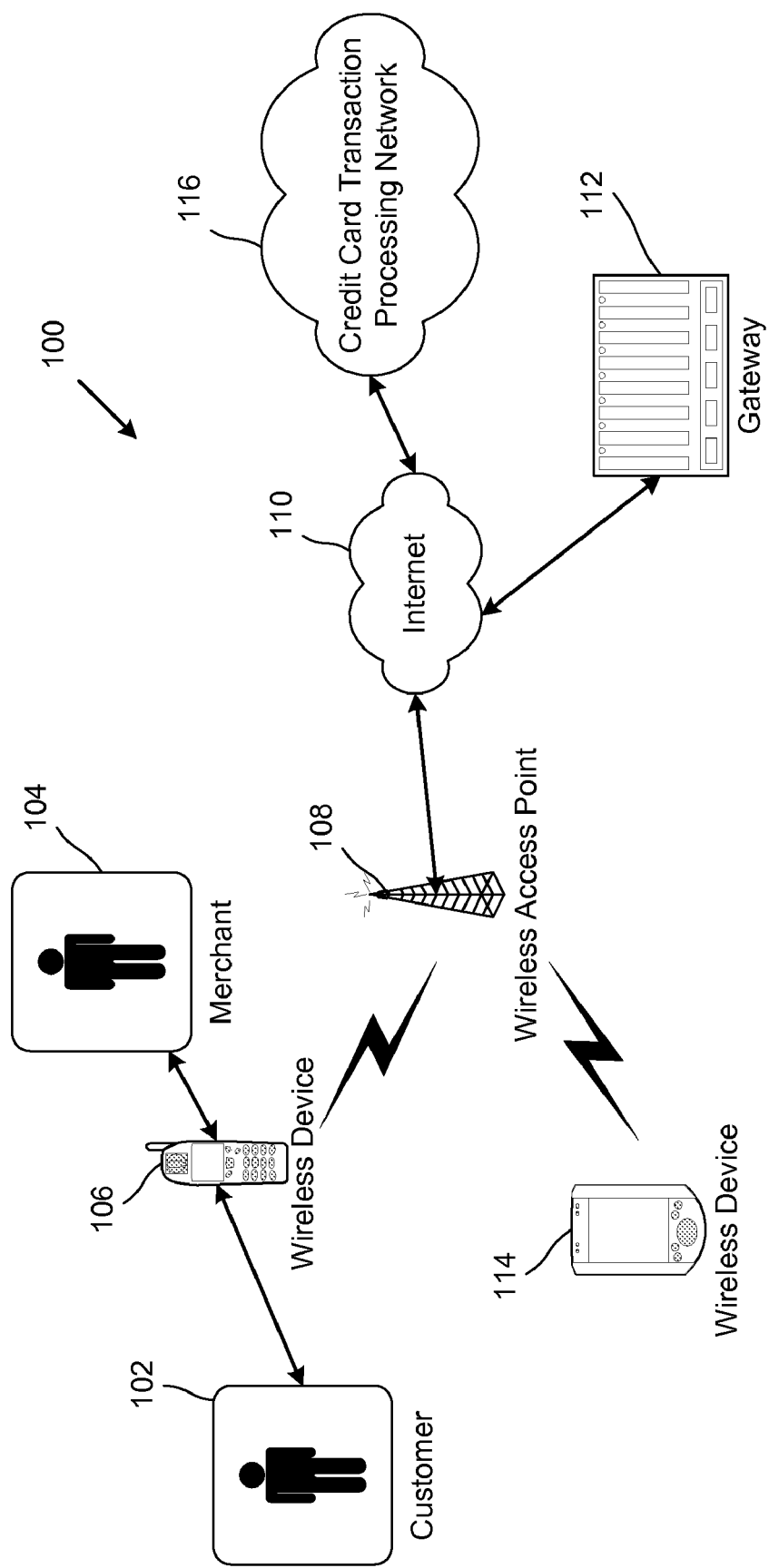
FIG. 1 illustrates an exemplary virtual terminal payer authorization system according to embodiments of the invention.

Embodiments of the present invention relate to systems and methods for obtaining payer authorization for a purchase transaction in the absence of a receipt-printing point-of-sale device. In order to provide a context for describing embodiments of the present invention, embodiments of the invention will be described herein with reference to using a credit card account and associated presentation instrument to purchase merchandise from a merchant when a receipt-printing point-of-sale (POS) device is not available. Those skilled in the art will appreciate, however, that other embodiments are possible. For example, embodiments of the invention may be used to obtain payer authorization even when a receipt-printing POS device is available.

The ensuing description provides preferred exemplary embodiment(s) only, and is not intended to limit the scope, applicability or configuration of the invention. Rather, the ensuing description of the preferred exemplary embodiment (s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

According to embodiments of the present invention, a merchant may obtain payer authorization for a presentation instrument purchase transaction in the absence of a traditional receipt-printing POS device and/or an encryption-certified POS terminal. Such situations are common in a number of well known market environments, such as flea markets, swap meeting, conventions, etc. In exemplary embodiments, a customer and a merchant enter into a purchase transaction. The merchant uses an Internet-enabled wireless device to access a virtual terminal service (e.g., LinkPoint.com, YourPay.com, etc.) or a payer authorization service (e.g., Verified by Visa, MasterCard Secure Code, etc.). The merchant enters transaction information into the wireless device, thereby creating a transaction record. In doing so, the merchant enters payment information from the customer. The payment information includes the customer's presentation instrument account information.

The customer may be registered for a payer authorization service according to embodiments of the invention. If so, the virtual terminal service returns a payer authorization request to the merchant's wireless device. The message asks for the customer's payer authorization code to be entered into the merchant's wireless device. The customer may enter his code in any of several ways according to embodiments of the invention.

In a first embodiments, the customer uses the keypad or other entry input device of the merchant's wireless device to enter his code. In another embodiment, the customer uses his own Near Field Communication (NFC)-enabled wireless device to send his payer authorization to the merchant's wireless device. In yet another embodiment, the customer uses a radio frequency identification (RFID)-enabled device to enter payer authorization information into the merchant's wireless device.

The merchant's wireless device then sends the payer authorization information to the virtual terminal service, and an authorization decision is made based thereon. Thereafter, the virtual terminal service may send an electronic receipt to the customer, perhaps to the same device the customer used on send his payer authorization information.

In some embodiments, the merchant and/or the customer may receive benefits for having used the payer authorization service. If the merchandise or service purchased by the customer was not immediately available, the customer may receive it on an expedited schedule since the transaction may be processed more expeditiously. The merchant may receive a reduce "interchange" fee for the transaction, even though the transaction is a "card not present" transaction, as that term is understood by those hiving skill in the art. This is because, even though the customer's presentation instrument was not physically swiped through a POS device and a receipt printed, which the customer signed, the customer provided an additional level of authorization (the customer's payer authorization code) that reduces the risk with respect to a "card not present transaction." While in some cases the merchant may be charged a "card present" interchange rate, the merchant nevertheless may be charged a lower interchange rate than that charged for a "card not present" transaction. Additionally or alternatively, the merchant may be provided charge-back protection for the transaction.

Having described embodiments of the present invention generally, attention is directed to FIG. 1, which illustrates an exemplary system 100 according to embodiments of the invention. Those skilled in the art will appreciate that the system 100 is merely exemplary of a number of possible embodiments.

According to this exemplary embodiment, a customer 100 and a merchant 104 enter into a transaction in which the customer desires to use a presentation instrument to settle the transaction. While not necessarily the case, it will be assumed for illustrative purposes that a receipt-printing POS is not available, thereby preventing the merchant from obtaining the customer's signature on a receipt. The merchant, therefore, uses an Internet-enabled wireless device 106 (e.g., mobile phone, PDA, etc.) to collect the transaction information and process the transaction. The merchant does so by using the device 106 to connect to a wireless access point 108 and thereby access a virtual terminal service residing on a network 110 (e.g., the Internet) or perhaps a gateway 112 related thereto.

The virtual terminal service recognizes the customer as having registered for payer authorization service and therefore requests the customer's payer authorization information. The customer enters his payer authorization information—which may include an email address to which an electronic receipt may be sent—into the merchant's wireless device, perhaps using his own wireless device 114. The customer's wireless device 114 may be NFC-enabled. In another embodiments, the customer uses an RFID-enabled device, which may be the customer's presentation instrument, to enter his payer authorization information into the merchant's wireless device. Other examples are possible.

Thereafter, the virtual terminal service may send an electronic receipt to the customer, perhaps to the customer's wireless device 114. The virtual terminal service also send the transaction information to a credit card transaction processing network 116 to thereby complete processing of the transaction. The merchant may thereafter be charged a lower interchange fee that would otherwise been changed for the transaction, since the transaction included payer authorization according to embodiments of the invention.

Having described exemplary system embodiments, attention is directed to FIG. 2, which illustrates an exemplary method 200 according to embodiments of the invention. The method 200 may be implemented in the system 100 of FIG. 1 or other appropriate system. Those skilled in the art will appreciate that other methods according to other embodiments may have more, fewer, or different blocks than those illustrated and described here. Further, those skilled in the art will appreciate that other methods according to other embodiments may traverse the steps illustrated and described herein in a different order than that depicted.

The method 200 begins at block 202 with the customer registering for the payer authorization service according to embodiments of the invention. This may include the customer registering with a particular virtual terminal service, the customer's credit card issuer, and/or the like. In doing so, the customer creates an authorization code that the customer must provide for particular transactions. In some embodiments the customer may encode the authorization code into a wireless device or otherwise enable a NFC-enabled device to authorize a transaction. In some embodiments, the customer provides information during the registration process that enables a RFID-enabled device to provide payer authorization. Many other examples exist.

At block 204, a merchant may register with a virtual terminal service. While not necessary, doing so may increase the efficiency of processing future transactions in which customers purchase the merchant's goods and/or services, which transaction are settled with the assistance of the virtual terminal service.

At block 206, the merchant and customer enter into a transaction in which the customer requests to use a presentation instrument account (e.g., credit card, debit card, stored value card, and/or the like) to settle the transaction. The transaction is assumed to take place in the absence of a receipt-printing POS device. Hence, the merchant is unable to "swipe" the customer's presentation instrument through the POS and is unable to obtain the customer's signature on a transaction receipt. As is known to those skilled on the art, such transactions are called "card not present" transactions (CNP). Merchants typically are charged a higher "interchange" fee for CNP transactions and/or may forego chargeback protection. In other words, such transactions are more expensive and potentially riskier for the merchant. Embodiments of the present invention, however, reduce the fees and/or risk by providing an additional form of payer authorization of the transaction.

At block 208, the merchant uses a network-enabled wireless device to access a virtual terminal service. Such services are well know means for processing presentation instruments transactions in the absence of POS devices. Such transaction, however, routinely are CNP transactions. If, however, a customer has registered for payer authorization according to embodiments of the invention, either with the virtual terminal service or in a way accessible by the virtual terminal service, the virtual terminal services may be used and the merchant may be charged fees less than otherwise for a CNP transaction. The merchant also may be provided chargeback protection.

Figure 3A:
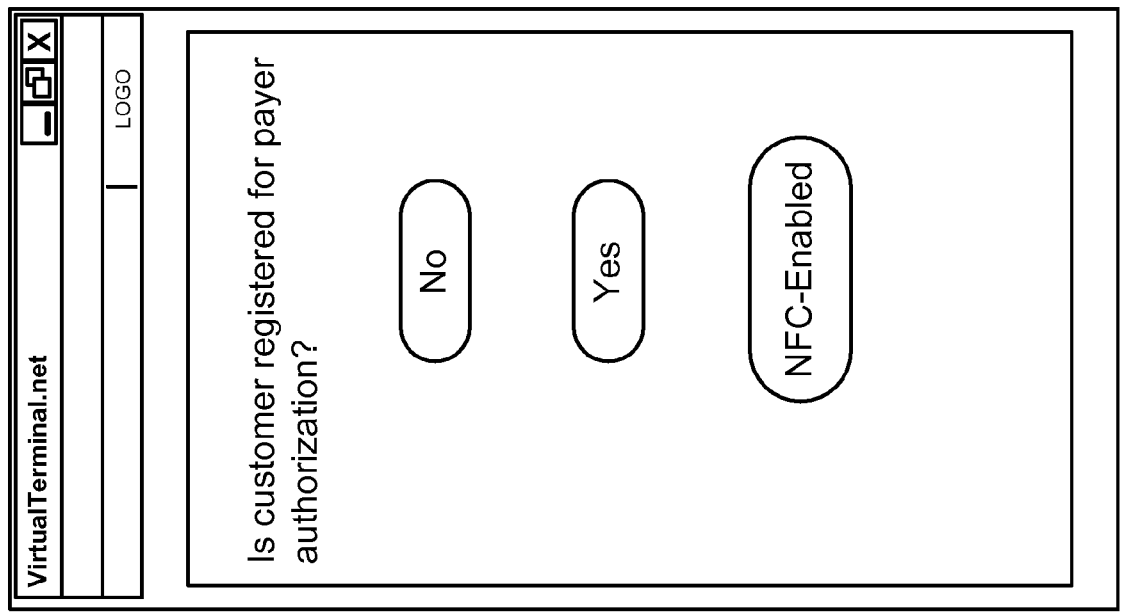
FIGS. 3A and 3B illustrate exemplary display screens that may be used to obtain payer authorization during a virtual terminal transaction according to embodiments of the invention.

Continuing with the description of block 208, the merchant, using his wireless device, provides transaction and payment information to the virtual terminal service. The virtual terminal service uses the information to identify the customer as being registered for payer authorization. In some embodiments, the payer authorization may routinely query whether the customer is registered for payer authorization. A display screen 300, depicted in FIG. 3A, may be used for such a query.

Figure 3B:
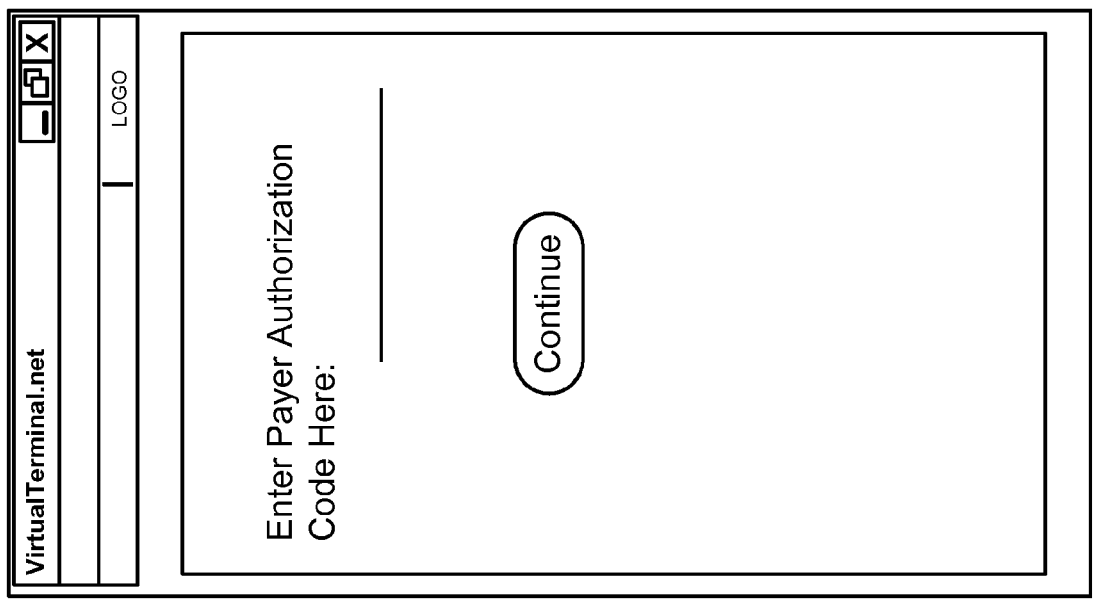

After an appropriate response to the display screen 300 or after the virtual terminal service recognizing the customer as being registered for payer authorization, the process continues at block 210. A display screen 302, FIG. 3B, may be used to collect the customer's payer authorization code into the merchant's wireless device. In other embodiments, the merchant's wireless device may be appropriately configured to receive payer authorization from a NFC-enabled device of the customer or from an RFID device of the customer. The payer authorization information is then sent to the virtual terminal service for further processing.

At block 212, the virtual terminals service determines whether to authorize the transaction by ensuring that the appropriate payer authorization information has been received and is correct. If the payer authorization information is incorrect, the transaction may be denied at block 214. If, however, the information is correct the transaction is allowed at block 216. Thereafter, the transaction is processed using a credit card transaction processing network or other appropriate processing service.

At block 218, the virtual terminal service may transmit a receipt to the customer. The receipt may be send to an email address of the customer or may be sent as an SMS or other appropriate message. In some embodiments, the receipt is sent t the same device the customer enabled to provide payer authorization. Many examples are possible.

Thereafter, the merchant may be charged a lower fee for the transaction, even though the transaction typically is a CNP transaction. In some embodiments, the merchant is provided chargeback protection for the transaction.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. For example, those skilled in the art know how to arrange computers into a network and enable communication among the computers. Moreover, those skilled in the art will appreciate that the concepts discussed herein may be directed toward other types of "card not present" transactions, such as telephone purchases and the like. Accordingly, the above description should not be taken as limiting the scope of the invention, which is defined in the following claims.

What is claimed is:

1. A method of obtaining payer authorization for a purchase instrument transaction conducted in physical proximity between a merchant and a customer in the absence of a transaction card reader, wherein the customer has previously registered for a payer authorization service, comprising:

the merchant using an Internet-enabled wireless mobile communication device to contact a virtual terminal service;

the merchant entering transaction information into the device;

the device transferring the transaction information to the virtual terminal service;

the virtual terminal service accessing a record relating to the customer, thereby identifying the customer as having registered for payer authorization;

the virtual terminal service sending a payer authorization request to the device of the merchant;

the customer entering a payer authorization code into the device of the merchant;

the device of the merchant sending the payer authorization code to the virtual terminal service;

the virtual terminal service comparing the payer authorization code to stored information relating to the customer;

the virtual terminal service sending an authorization message to the device of the merchant based on the comparison; and charging the merchant an interchange rate relating to the transaction, wherein the interchange rate is less than an interchange rate for a "card not present" transaction.

2. The method of claim 1, further comprising, the merchant registering with the virtual terminal service prior to the transaction.

3. The method of claim 1, wherein the customer entering payer authorization information into the device of the merchant comprises receiving a signal into the device of the merchant from a wireless device of the customer.

4. The method of claim 3, wherein the signal comprises a Radio Frequency Identification signal.

5. The method of claim 3, wherein the signal comprises a Near Field Communication Technology signal.

6. The method of claim 1, further comprising, receiving an electronic receipt at a wireless device of the customer.

7. The method of claim 1, further comprising, providing the merchant chargeback protection for the transaction.

8. The method of claim 1, further comprising, the merchant registering with the virtual terminal service prior to the transaction.

9. The method of claim 1, wherein the customer entering payer authorization information into the device of the merchant comprises receiving a signal into the device of the merchant from a wireless device of the customer.

10. The method of claim 3, wherein the signal comprises a Radio Frequency Identification signal.

11. The method of claim 3, wherein the signal comprises a Near Field Communication Technology signal.

12. The method of claim 1, further comprising, receiving an electronic receipt at a wireless device of the customer.

13. The method of claim 1, further comprising, providing the merchant chargeback protection for the transaction.

14. A method of obtaining payer authorization for a purchase instrument transaction conducted in physical proximity between a merchant and a customer in the absence of a transaction card reader where the customer has previously registered for a payer authorization service, comprising:

the merchant using an Internet-enabled wireless mobile communication device to contact a virtual terminal service;

the merchant entering transaction information into the device;

the device transferring the transaction information to the virtual terminal service;

the virtual terminal service accessing a record relating to the customer, thereby identifying the customer as having registered for payer authorization;

the virtual terminal service sending a payer authorization request to the device of the merchant;

the customer entering a payer authorization code into the device of the merchant;

the device of the merchant sending the payer authorization code to the virtual terminal service;

the virtual terminal service comparing the payer authorization code to stored information relating to the customer;

the virtual terminal service sending an authorization message to the device of the merchant based on the comparison; and charging the merchant an interchange rate for the transaction, wherein the interchange rate is less than an interchange rate for a "card not present" transaction.

* * * * *